United States Patent [19]
Dumazet et al.

[11] Patent Number: 5,798,128
[45] Date of Patent: Aug. 25, 1998

[54] PLANT FOR MANUFACTURING STRUCTURAL COMPONENTS MADE OF FIBRE-REINFORCED THERMOPLASTIC

[75] Inventors: Philippe Dumazet, Montbeliard; Daniel Ougier, Seloncourt; Gerard Gropelier, Montbeliard, all of France

[73] Assignee: ECIA—Equipements Et Composants Pour L'Industrie Automobile, Audincourt, France

[21] Appl. No.: 749,841

[22] Filed: Nov. 15, 1996

[51] Int. Cl.$^6$ .......................... B29C 31/06; B29C 45/47; B29C 45/56

[52] U.S. Cl. .................. 425/147; 425/166; 425/204; 425/258; 425/449; 425/557; 425/561

[58] Field of Search .................. 425/258, 256, 425/449, 560, 561, 557, 147, 166, 204, 408, 412, 546

[56] References Cited

U.S. PATENT DOCUMENTS

| | | | |
|---|---|---|---|
| 2,881,477 | 4/1959 | Triulzi | 425/449 |
| 3,205,536 | 9/1965 | Funck | 425/258 |
| 3,453,356 | 7/1969 | Kent, Jr. et al. | 264/143 |
| 4,397,806 | 8/1983 | Hettinga | 425/561 |
| 4,775,312 | 10/1988 | Werz et al. | 425/412 |
| 4,867,665 | 9/1989 | Wada | 425/560 |
| 4,925,381 | 5/1990 | Aoki et al. | 425/449 |
| 5,030,080 | 7/1991 | Fukuda et al. | 425/256 |
| 5,165,941 | 11/1992 | Hawley | 425/148 |
| 5,185,117 | 2/1993 | Hawley | 425/205 |
| 5,401,154 | 3/1995 | Sargent | 425/114 |
| 5,403,178 | 4/1995 | Steger | 425/561 |
| 5,462,422 | 10/1995 | Gustavel et al. | 425/258 |

FOREIGN PATENT DOCUMENTS

| | | | |
|---|---|---|---|
| 423676 | 4/1991 | European Pat. Off. | |
| 2124315 | 9/1972 | France | |
| 2504446 | 10/1982 | France | 425/258 |
| 2403481 | 8/1975 | Germany | |
| 61-181618 | 8/1986 | Japan | 425/557 |
| 4-286617 | 10/1992 | Japan | 425/557 |
| 5-212763 | 8/1993 | Japan | 425/561 |
| WO 86/06321 | 11/1986 | WIPO | 425/561 |

OTHER PUBLICATIONS

Patent Abstracts Of Japan, vol. 7, No. 199, (M–240), Sep. 3, 1983 & JP–A–58 098231 (Toyota Jidosha Kogyo K.K.) Jun. 11, 1983.

Patent Abstracts Of Japan, vol. 12, No. 404, (M–757), Oct. 26, 1988 & JP–A–63 147615 (Takashimaya Nitsupatsu Kogyo K.K.) Jun. 20, 1988.

Database WPI, Week 8417, Derwent Publications, Ltd. London, G.B. AN 84–104808 & JP–A–57 066915, (Showa Denko K.K.), Mar. 19, 1984.

Patent Abstracts Of Japan, vol. 6, No. 146 (M–147), Aug. 5, 1982 & JP–A–57 066915 (Showa Denko K.K.) Apr. 23, 1982.

*Primary Examiner*—Robert Davis
*Attorney, Agent, or Firm*—Sughrue, Mion, Zinn, Macpeak & Seas, PLLC

[57] ABSTRACT

This plant for manufacturing fiber-reinforced thermoplastic structural components, especially for motor vehicles, is characterized in that it includes:

- means (1) of continuous production of a dough of a fiber-reinforced thermoplastic compound, receiving as input, on the one hand, the thermoplastic (4) and, on the other hand, the reinforcing fibers (6);
- means (14) of accumulation and of temporary storage of the dough produced; and
- means (26) of removing the dough from the accumulation and temporary-storage means (14) and of introducing this removed dough into a mould (29) for forming the component.

49 Claims, 4 Drawing Sheets

PLANT FOR MANUFACTURING STRUCTURAL COMPONENTS MADE OF FIBRE-REINFORCED THERMOPLASTIC

BACKGROUND OF THE INVENTION

The present invention relates to a plant for manufacturing structural components made of fibre-reinforced thermoplastic, especially for motor vehicles.

Motor vehicles include many structural components of this type which go to make up these vehicles.

An example of such a component is the component for supporting one or more ventilation units arranged opposite the radiator for cooling the engine coolant of a vehicle.

These structural components are generally manufactured at motor-vehicle equipment manufacturers from sheets which are preformed at a material supplier, these sheets being preformed from a mixture of thermoplastic and reinforcing fibres.

It is then necessary for equipment manufacturers to heat these plates and then to arrange them in a mould, for example a compression mould, between a mould cavity and a header die of the mould, in order to form the structural component upon closing this mould.

However, it may be imagined that this has a number of drawbacks because, on the one hand, of problems in the supply, storage and handling of these sheets and, on the other hand, in the working of the latter.

This is because the delivery of such sheets to the equipment manufacturers requires them to make a certain number of arrangements with regard to the supply of these sheets, their storage, in a sufficient number to avoid any problems in running out of stock, and their handling during their delivery and their transfer to the units for converting them into structural components.

Moreover, and although these sheets are heated before they are introduced into a mould, and therefore before the components are formed, their structure is such that the various options in the conversion of the sheets are relatively limited.

However, motor-vehicle structural components are tending to become increasingly complex and to have, in particular, very specific shapes which it is very difficult, if not impossible, to obtain from a heated fibre-reinforced thermoplastic sheet using, especially, a compression mould.

The existence in the prior art of injection moulds for manufacturing such motor-vehicle structural components is also known.

A dough consisting of a fibre-reinforced thermoplastic compound is then injected under pressure into such a mould in order to form the components.

However, the use of such moulds requires installing in the immediate vicinity of these moulds means of production of the dough from the fibre-reinforced thermoplastic compound, these production means being linked to the moulds through means such as injection presses.

It may also be imagined that such a plant is extremely complex to set up, to operate and to maintain.

SUMMARY OF THE INVENTION

The object of the invention is therefore to solve these problems.

For this purpose, the subject of the invention is a plant for manufacturing structural components made of fibre-reinforced thermoplastic, especially for motor vehicles, characterized in that it includes:

means of continuous production of a dough of a fibre-reinforced thermoplastic compound, receiving as input, on the one hand, the thermoplastic and, on the other hand, the reinforcing fibres;

means of accumulation and of temporary storage of the dough produced; and means of removing dough from the accumulation and temporary-storage means and of introducing this removed dough into a mould for forming the component.

Advantageously, the means of continuous production of the dough comprise a temperature-regulated extruder which receives, at a first input, the thermoplastic and, at a second input, the reinforcing fibres.

According to a first embodiment, the means of accumulation and of temporary storage of the dough produced are formed by a dough-output end zone of these production means.

According to a second embodiment, the dough accumulation and temporary-storage means are formed by temperature-regulated reservoir-forming dough storage means which are arranged at the exit end of the production means, the inlet of which is connected to the exit of these production means and the exit of which includes shut-off means connected to means of controlling the opening and closing of these shut-off means.

Advantageously also, the dough removal and introduction means comprise temperature-regulated syringe-formed means which include at least one dough charging/discharging orifice, which means are carried by handling means and can move between a first position for charging with dough, in which position the dough charging/discharging orifice of the syringe-formed means is opposite the exit of the dough accumulation and temporary-storage means in order to allow transfer of the dough from these accumulation and temporary-storage means to the syringe-formed means, and a second position for introducing the dough with which these means are charged into the mould for forming the component.

It will be noted that the mould may be an injection mould into which the dough is injected or a compression mould which includes a mould cavity, in which the dough is deposited in the form of a bead, and a corresponding header die.

The invention will be more clearly understood on reading the description which follows, given solely by way of example and with reference to the appended drawings, in which:

DESCRIPTION OF THE PREFERRED EMBODIMENTS

Figure 1:
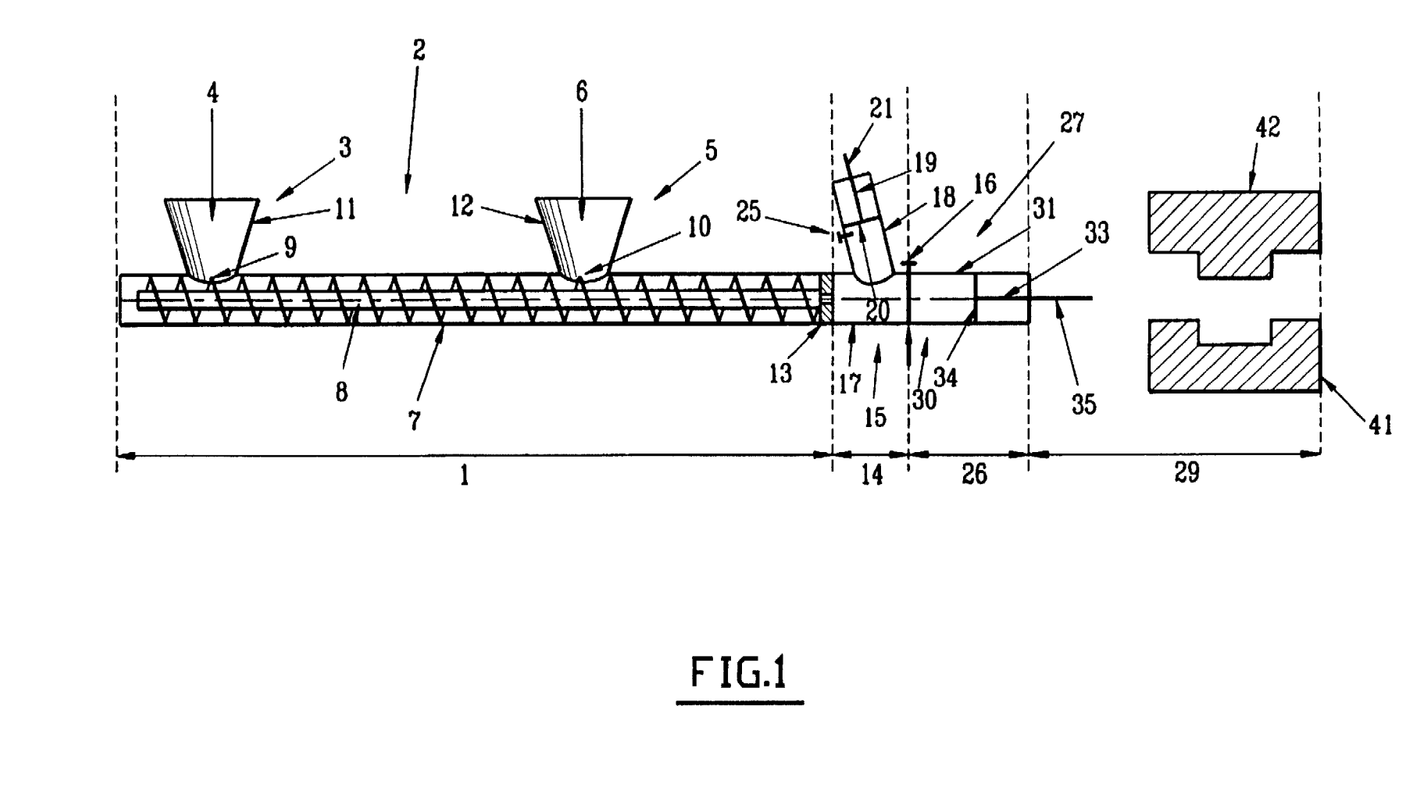
FIG. 1 represents a schematic diagram illustrating an embodiment of a plant for manufacturing motor-vehicle structural components.

FIG. 1 shows a schematic diagram illustrating the general structure of an embodiment of a plant for manufacturing structural components made of fibre-reinforced thermoplastic, especially for motor vehicles.

This manufacturing plant includes means of continuous production of a dough from a fibre-reinforced thermoplastic compound, these means being designated by the general reference 1 in this figure.

These continuous dough production means comprise, for example, a temperature-regulated extruder, designated by the general reference 2, receiving at a first input, designated by the general reference 3, the thermoplastic 4 and at a second input, designated by the general reference 5, the reinforcing fibres 6.

This extruder conventionally includes an elongate barrel 7 in which at least two extrusion screws are arranged, only one of which, for example 8, is shown, these screws being parallel, intermeshing and associated with rotational driving means (not shown).

This barrel therefore includes thermoplastic and reinforcing-fibre inlet orifices 9, 10. These orifices are associated with feed hoppers, respectively 11 and 12.

Heating means are associated with this barrel in order to regulate, in a conventional manner, the temperature of the various portions of the extruder.

The thermoplastic may, for example, be polypropylene, while the reinforcing fibres may be mineral fibres, such as glass fibres, or organic or natural fibres, such as wood, flax or hemp fibres.

Conventionally, the speed of rotation of the screws 8 of this extruder and the temperature of the various portions thereof are controlled in order to allow rapid melting of the thermoplastic introduced into this extruder, for example in the form of powder or of granules, and then introduction into the extruder of the reinforcing fibres when the thermoplastic is in the molten phase, so as to obtain an intimately and homogeneously mixed compound of this thermoplastic and these reinforcing fibres at the exit of this extruder.

It may be imagined, of course, that the temperature of the various portions of this extruder and the speed of rotation of the screws thereof must be tailored to the thermoplastic and to the reinforcing fibres used.

Thus, for example, in the case of the continuous production of a dough of a polypropylene/glass-fibre compound, the speed of rotation of the screws may be between 50 and 150 rpm and is, preferably, equal to approximately 100 rpm.

The temperature of the zone of this extruder into which the thermoplastic is introduced may be about 180° C., the temperature of the barrel of this extruder increasing from this thermoplastic inlet zone up to the reinforcing-fibre inlet zone and going, for example, to approximately 250° C., and thereafter stabilizing or decreasing slightly at the exit of this extruder, for example at approximately 240° C.

This extruder therefore includes three portions having different temperatures, a first portion which extends between the thermoplastic inlet zone and the reinforcing-fibre inlet zone, and being a zone for heating and conveying this material, possibly having a length of, for example, 550 mm, a second portion which extends opposite the reinforcing-fibre inlet zone, allowing mixing of these fibres with the thermoplastic and having, for example, a length of 50 mm and a third portion for conveying the thermoplastic/fibre compound to the exit of this extruder, having a length, for example, of 600 mm.

It goes without saying, of course, that different temperatures, different speeds of rotation and different screw profiles of this extruder may be used depending on the nature of the thermoplastic and of the reinforcing fibres.

Thus, for example, in the case in which natural reinforcing fibres are used, the temperatures of the various portions of the extruder are slightly lower than those indicated above, while the speed of rotation of the screws of the extruder may, for example, be about 300 rpm.

In the case of the use of these natural fibres, more complex screw profiles than those mentioned previously are also necessary in order to obtain good mixing of the thermoplastic with the fibres.

This extruder may also be equipped with conventional venting means.

It may therefore be envisaged that these continuous production means make it possible to obtain a dough from a fibre-reinforced thermoplastic compound starting, on the one hand, from a thermoplastic and, on the other hand, from reinforcing fibres.

Next, this dough passes, for example, into an exit die 13 of this extruder in order to enter, in the form of a dough sausage, means of accumulation and of temporary storage of this dough, these means being designated by the general reference 14 in this FIG. 1.

Figure 2:
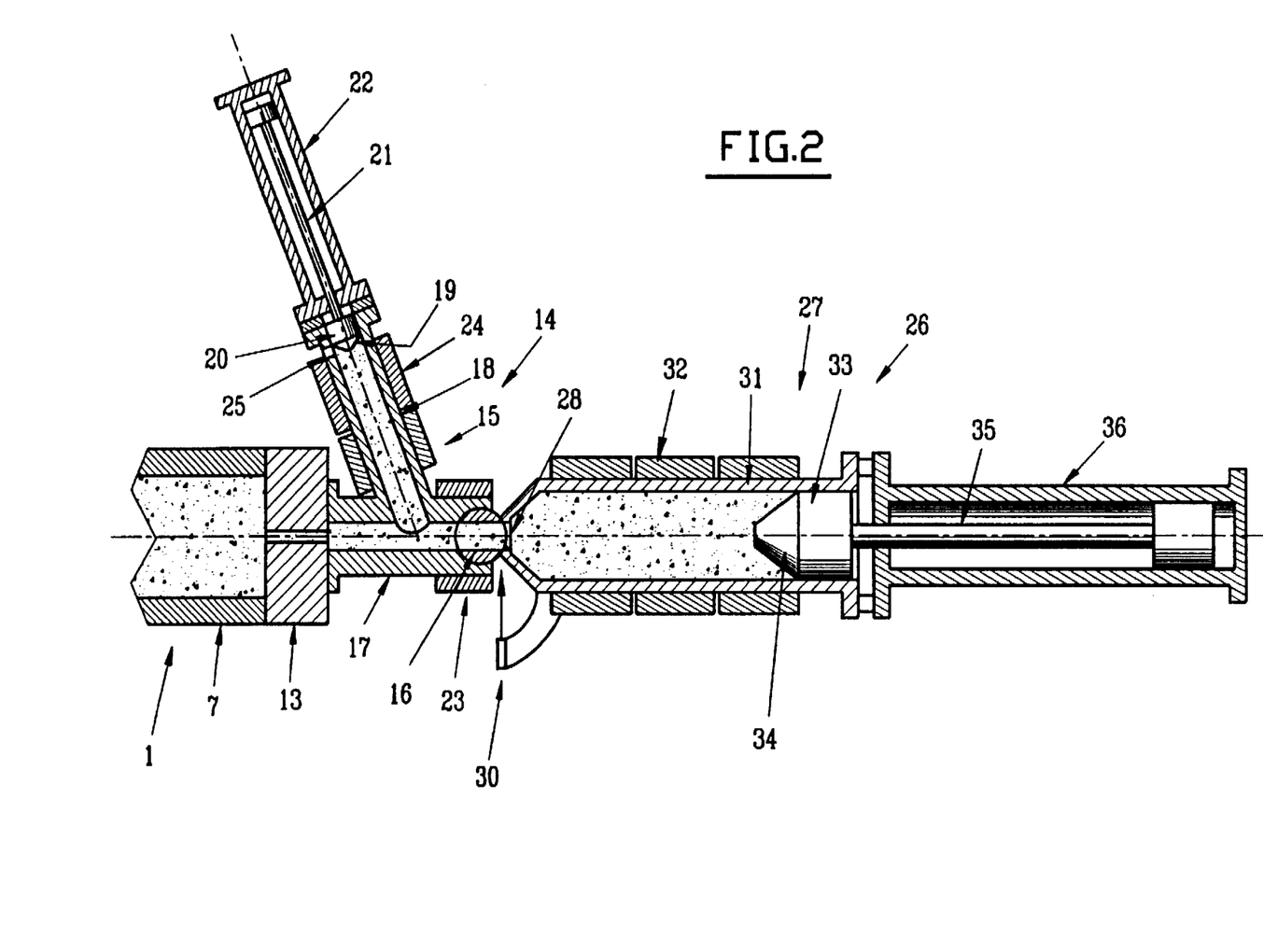
FIG. 2 represents a sectional view illustrating an embodiment of the means of accumulation and of temporary storage of the dough and of the means of removing and of introducing this dough, forming part of such a plant.

As may be seen in this FIG. 1 and more clearly in FIG. 2, these dough accumulation and temporary-storage means 14 may include, according to one embodiment, temperature-regulated reservoir-forming storage means 15 arranged at the exit end of the production means and, for example, at the exit of the die 13 of the extruder, the inlet of which is connected to the exit of these production means and the exit of which includes shut-off means 16, these being connected to means of controlling the open and closing of these shut-off means, as will be described in more detail below.

In the embodiment represented in these figures, these reservoir-forming dough storage means 15 include a first reservoir part which is, for example cylindrical and designated by the general reference 17, extending along the extension of the production means and including a first end which forms the inlet of these means and is connected to the production means 1 and a second end which forms the exit of these means, this second end being provided with shut-off means 16, and a second reservoir part, which is cylindrical, for example, and designated by the general reference 18, extending laterally from the first, dough compaction/ejection means being arranged in this second part 18.

These dough compaction/ejection means are designated by the general reference 19 in these figures.

In fact, these dough compaction/ejection means may comprise a piston 20 mounted so that it can move in this second reservoir part 18, this piston including a rod 21 associated with means of controlling the movement of this piston in this second reservoir part 18.

These control means are designated by the general reference 22 in FIG. 2 and consist, for example, of a device of the hydraulic or pneumatic cylinder actuator type, the exit rod of which is associated with the rod 21 of the piston 20 arranged in the second reservoir part 18.

The operation of these compaction/ejection means is controlled by control means associated with sensors which detect the position of the piston in the second reservoir part 18, which sensors will be described in more detail below, in order to allow two operating modes of this piston.

In fact, in a first operating mode, during accumulation of dough in the accumulation and temporary-storage means 14, the shut-off means 16 being closed, these means of controlling the movement of the piston behave as means of braking the movement of this piston 20 in one direction, that is to say when the latter rises, for example, back into the corresponding second reservoir part 18, in order to obtain a certain compression of the dough inside these reservoir-forming means, this dough being delivered continuously by the production means 1.

When the piston 20 has reached a high position in the second reservoir part 18 of these means, the latter then being full, the control means then behave as means of moving this piston 20 in the other direction, so as to make the piston 20 descend into the corresponding reservoir part 18, in order to eject the dough from these accumulation and temporary-storage means, as will be described in more detail below.

Heating means, respectively 23 and 24, may be arranged around each of the parts 17 and 18 of these reservoir-forming means 15 in order to regulate the temperature of these means and therefore of the dough contained therein.

These heating means comprise, for example, electrical resistance elements whose supply is controlled in order to provide conventional temperature regulation.

It will be noted that these accumulation and temporary-storage means may also include an overflow valve of conventional type, this valve being provided, for example, on the second reservoir part, designated by the general reference 18 and this overflow valve being designated by the reference 25 in these FIGS. 1 and 2.

This makes it possible to evacuate the overflow of fibre-reinforced thermoplastic dough in the event of malfunction of the plant.

As indicated previously, the exit of these reservoir-forming means 15 includes shut-off means 16.

These shut-off means 16 may have any suitable structure and may, for example, be formed by a device in the form of a valve, any gate valve or a gate-type shut-off device, etc., the movements of which are controlled by control means.

The manufacturing plant also includes means of removing the dough from these accumulation and temporary-storage means and of introducing this removed dough into a mould for forming the structural component.

These dough removal and introduction means are designated by the general reference 26 in these figures.

In fact, and as may be seen more clearly in FIG. 2, these dough removal and introduction means may comprise temperature-regulated syringe-formed means, designated by the general reference 27, which include at least one dough charging/discharging orifice, designated by the general reference 28, which means are carried by handling means which will be described in more detail later and which can move between a first position for charging with dough, in which position, shown in these FIGS. 1 and 2, the dough charging/discharging orifice 28 of the syringe-formed means 27 is opposite the exit of the dough accumulation and temporary-storage means in order to allow transfer of dough from these accumulation and temporary-storage means to the syringe-formed means, and a second position for introducing the dough with which these means are charged into a mould for forming the component, this mould being, for example, designated by the general reference 29 in FIG. 1.

As may be seen in FIG. 2, the dough charging/discharging orifice 28 of these syringe-formed means 27 is advantageously associated with shut-off means 30 formed, for example, by a shutter flap which can move between an active position and a retracted position in front of this orifice in order both to shut off the latter and to cut off the bead of dough delivered via the exit of the accumulation and temporary-storage means.

Other embodiments of these shut-off means 30 may, of course, be envisaged.

The operation of these shut-off means 30 is also controlled, with respect to opening and closing, by control means which will be described in more detail below.

In fact, the syringe-formed means may include a syringe body designated by the general reference 31 in these figures, one end of which includes the charging/discharging orifice 28, around which syringe body are arranged heating means 32.

These heating means may also be formed by electrical resistance elements whose supply is controlled by control means in order to regulate the temperature in a conventional manner.

In addition, dough compaction/ejection means are arranged in this syringe body 31, these means being designated by the general reference 33 in these figures.

These dough compaction/ejection means may also comprise a piston 34 mounted so that it can move in the syringe body, this piston including a rod 35 associated with means of controlling the movement of this piston in the syringe body 31, these control means being designated by the general reference 36 in FIG. 2.

These control means also form means of braking the movement of the piston 34 in one direction, during charging of the syringe-formed means with dough, that is to say when the piston has moved back into this body, in order to obtain a degree of compression of the dough in these means, and means of moving this piston 34 in the other direction, that is to say towards the front end, provided with the orifice 28, of these means, in order to discharge the dough from these means.

As will be described in more detail later, these control means are also associated with sensors which detect the position of the piston 34 in the syringe body 31 and with means of controlling their operation.

In the example illustrated in this FIG. 2, these control means also include a device of the cylinder actuator type, for example a hydraulic or pneumatic cylinder actuator, the output rod of which is associated with the rod 35 of the piston 34 arranged in the syringe body 31.

It may therefore be imagined that these syringe-formed means make it possible to remove a defined quantity of dough from the accumulation and temporary-storage means 14 when the shut-off means, respectively 16 for shutting off the exit of these accumulation and temporary-storage means 14 and 30 for shutting off the charging/discharging orifice 28 of these removal means 26, are open.

The ejection of dough from these accumulation and temporary-storage means 14, by virtue of especially the piston 20 thereof, allows the removal means to be charged with dough.

Figure 3:
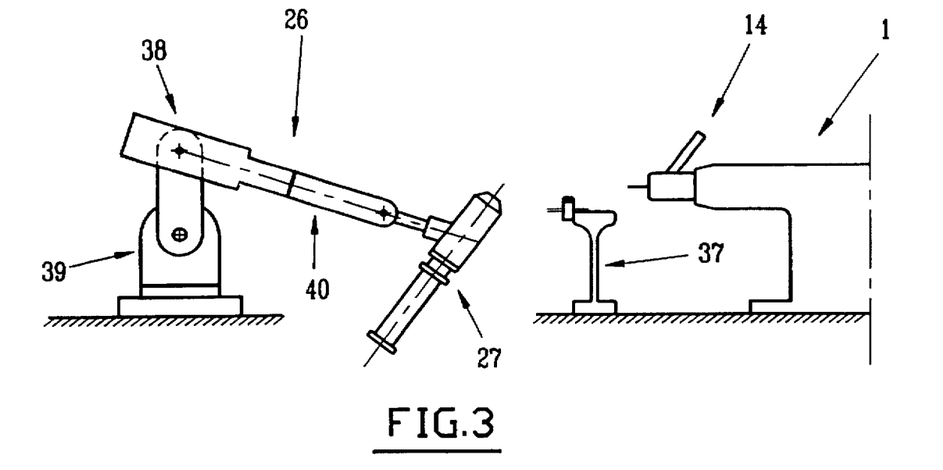
FIG. 3 represents a schematic diagram illustrating the structure and operation of means of handling the removal and introduction means, forming part of such a plant.

These removal means, and more particularly their syringe-formed means 27, are, for example, arranged, as may be seen in FIG. 3, in line with the extruder and the accumulation and storage means, on a support 37 for centring them so that their charging/discharging orifice 28 is opposite the exit of the accumulation and storage means.

The syringe-formed means 27 are associated, as indicated previously, with handling means enabling them to move between this charging position and a position for discharging the dough into the mould.

For this purpose, these handling means comprise, for example as may be seen in FIG. 3, a conventional-type handling robot, designated by the general reference 38, which includes, for example, a fixed base 39 on which is movably mounted a moving arm 40 at the end of which are fixed the syringe-formed means 27.

The operation of this robot 38 is controlled by control means, which will be described in more detail later, in order to move these syringe-formed means 27 between the previously described charging position and the position for discharging and introducing the discharged dough into the mould.

As was described with regard to FIG. 1, the mould may be a compression mould 29 conventionally comprising a mould cavity 41 on which may be arranged a corresponding header die 42, in order to form the structural component.

It may therefore be imagined that the movements of the arm 40 of the handling robot 38 may be controlled so that the end of the arm and therefore the syringe-formed means 27 follow a predetermined path in the mould cavity 41 in order to deposit a bead of dough uniformly in this mould cavity, by activating the means 36 of moving the piston 34 of these means so as to eject the dough therefrom.

Figure 4:
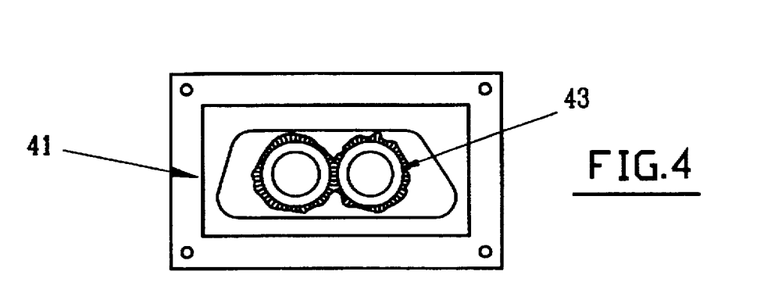
FIG. 4 represents a plan view of a mould cavity of a compression mould, forming part of such a plant.
Figure 5:
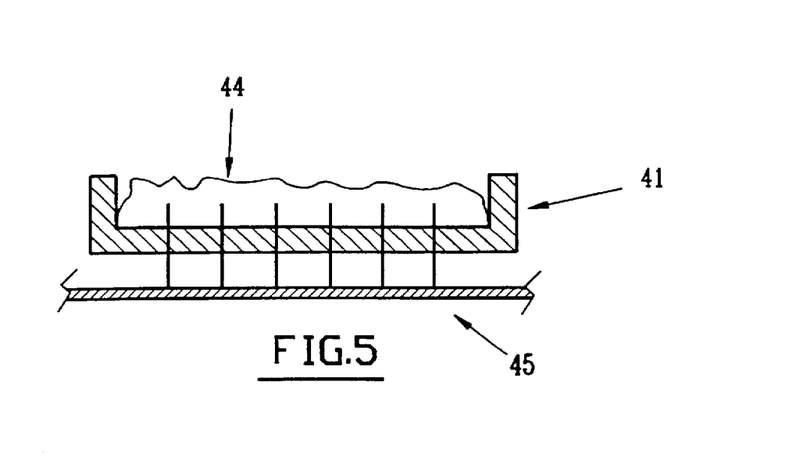
FIG. 5 represents a diagrammatic sectional view of a mould cavity of a compression mould, forming part of such a plant.

This bead is, for example, designated by the general reference 43 in FIGS. 4 and 5.

This deposition of dough therefore makes it possible to create a mould-charging plane which can be tailored to its geometry and which, in particular, affects the final properties, for example the mechanical strength, of the components obtained.

Of course, it will be noted that the mould may also be a mould for manufacturing components by injecting thermoplastic into the mould.

In the case in which the mould is a compression mould, like that described with regard to FIGS. 4 and 5, the mould cavity 41 thereof may include means of immobilizing the deposited bead of dough.

These immobilizing means are, for example, designated by the general reference 44 in FIG. 5 and can be moved between an active position of immobilization of the bead of dough, in which position they project above the surface of the mould cavity 41, and a position in which they are retracted in the latter, once the bead of dough has been deposited.

These immobilizing means 44 may in fact comprise needles passing through corresponding holes in the mould cavity 41 of the mould, these needles being fixed to a support plate 45 which can be moved, for example, by a device of the cylinder-actuator type, between a high position in which the needles extend above the surface of the mould cavity and a low position in which the needles are retracted into the mould cavity 41, under the control of control means, upon closing the mould, that is to say upon putting the header die 42 on the mould cavity 41.

The reason for this is that it has been observed that, when moving the arm 40 of the handling robot 38 and therefore the syringe-formed means 27 along a predetermined path in this mould cavity, the deposited bead of dough tended to move, sliding on the surface of this mould cavity, which could cause problems during formation of the component.

These immobilizing means, comprising needles for example, make it possible to hold this bead of dough in position so as subsequently, upon closing the mould, to form the component correctly.

It will be noted that the various parts of the plant which have just been described, that is to say the means of continuous production of the dough of the fibre-reinforced thermoplastic compound, the means of accumulation and of temporary storage of this dough and the means of removing and introducing this dough into the mould may operate under a controlled atmosphere, for example an atmosphere of an inert gas, such as nitrogen, in order to avoid any problem of degradation and, in particular, of oxidation of the thermoplastic/fibre compound.

Means enabling, for example, such a gas to be injected into the various means of the plant described are well known in the prior art so that they will not be described in detail below.

Figure 6:
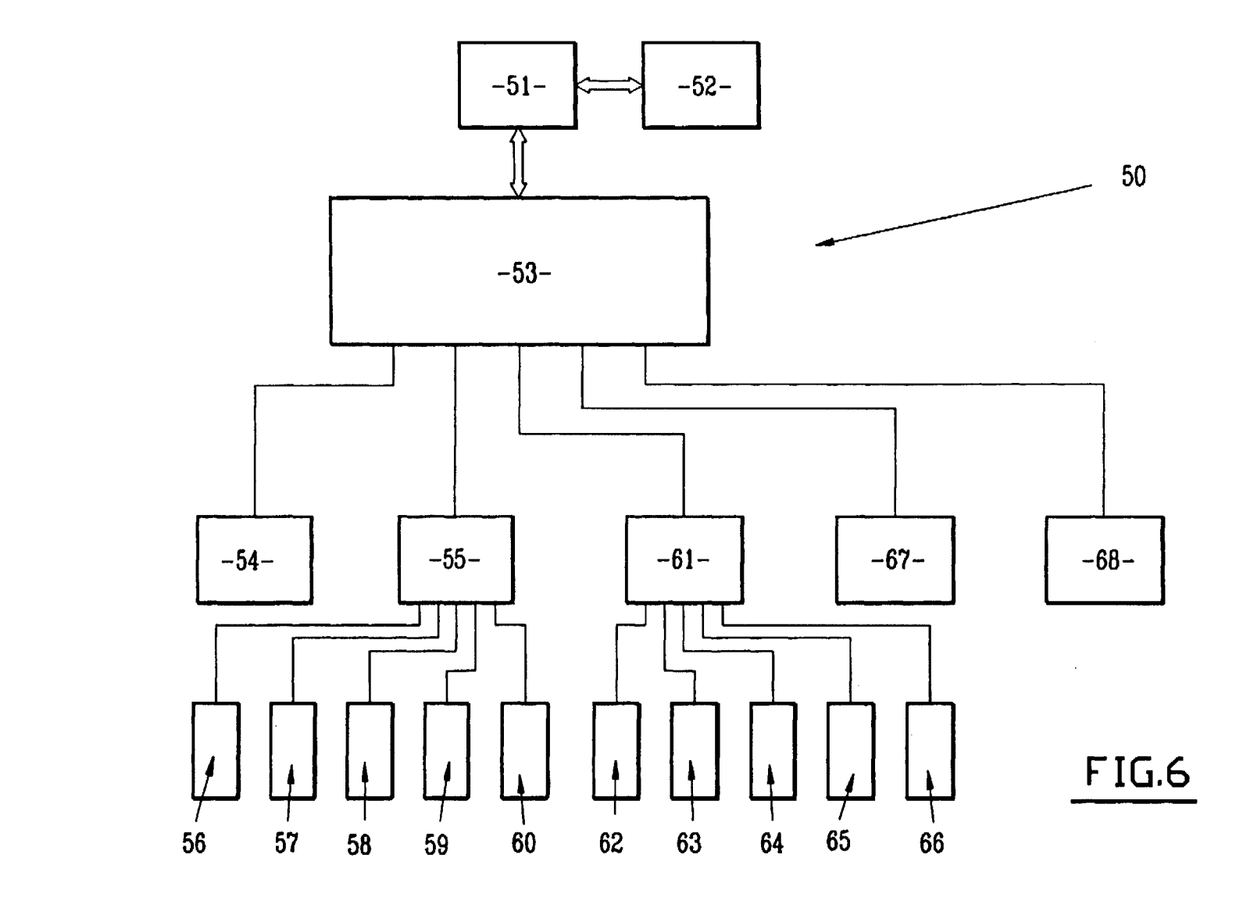
FIG. 6 represents a schematic diagram of an embodiment of means of controlling the various means, forming part of such a plant.

The operation of this plant may be controlled by one or more central information-processing units based on computers, like the unit designated by the general reference 50 in FIG. 6.

This unit 50 therefore includes, for example, a central computer 51 associated with information memory means 52 and with interface means 53 enabling this central information-processing unit to be connected to the various parts of this plant.

Thus, for example, this unit may be linked via the interface means 53 to means 54 of controlling the means 1 of continuous production of the dough, in order to control the various operating parameters of these means and, more particularly, of the extruder of these means.

These parameters are, for example, the parameters relating to the supply of this extruder with base products, the speed of rotation of the screws, the temperature of the various portions of the extruder, etc.

These interface means 53 are also linked to means 55 of controlling the operation of the means 14 of accumulation and of temporary storage of the dough produced.

As indicated previously, these control means comprise sensors 56 and 57 which detect the position of the piston 20 in the second reservoir part 18 of these means.

These accumulation and storage means 14 also comprise means of controlling the operation of the cylinder actuator 22 of the latter, these control means being designated by the general reference 58 in this FIG. 6, and means of controlling the operation of the means 16 of shutting off the exit of these accumulation and temporary-storage means, these control means being designated by the general reference 59 in this FIG. 6.

In addition, these accumulation and temporary-storage means are also associated with means 60 of regulating the temperature of the two parts of the latter by controlling the power supplied, for example, to the electrical resistance elements 23 and 24.

The interface means 53 are also linked to means 61 of controlling the dough removal and introduction means 26, which have a similar structure, that is to say they include means 62 of controlling the heating means 32 of the syringe body 31, sensors 63 and 64 which detect the position of the piston 34 inside this syringe body, means 65 of controlling the operation of the means 30 of shutting off the charging/discharging orifice 28 of the syringe body and means 66 of controlling the operation of the cylinder actuator 36 of these means.

These interface means 53 are also linked to means 67 of controlling the operation of the handling robot 38 described previously and to means 68 of controlling the operation of the mould 29 and means 14 of immobilizing the latter.

It may therefore be envisaged that the operation of this plant is as follows.

With the extruder 2 operating, thermoplastic 4 is introduced into the extruder orifice 9.

The screws of this extruder then drive this thermoplastic towards the zone for introduction of the reinforcing fibres 6 via the orifice 10 in the extruder barrel. During this movement, the thermoplastic is heated and melted so that, when the reinforcing fibres are introduced into the extruder, these fibres mix intimately with the thermoplastic in the melt phase. This fibre-reinforced thermoplastic compound is then conveyed by the screws to the exit die 13 of this extruder.

The means 16 of shutting off the means 14 of accumulation and of temporary storage of dough produced are closed and the piston 20 of these means is initially in the low position in the corresponding second reservoir part 18.

Accumulation of dough in these accumulation and temporary-storage means causes, because of the closure of the shut-off means 16, the first and second reservoir parts 17 and 18 of these means to be filled, pushing the piston 20 back into the second reservoir part 18 of these means, this piston therefore rising back into a high position in which it actuates the corresponding position sensor.

During this dough accumulation phase, the movement of this piston 20 is braked by the cylinder actuator 22 in order to compress the dough slightly.

During this time, the robot 38 has placed empty syringe-formed means 27 so as to face the exit of these accumulation and temporary-storage means 14. The means 30 of closing off the charging/discharging orifice 28 of these means are in the open position and the piston 34 of these means is located in the vicinity of this orifice, that is to say in the vicinity of the front end of these means.

The central processing unit then causes, on the one hand, the means 16 of shutting off the accumulation and temporary-storage means 14 to open and, on the other hand, the piston 20 to move in the second reservoir part 18 of the dough accumulation and temporary-storage means so as to cause it to descend and therefore to cause the dough to be ejected from these accumulation and temporary-storage means into the syringe-formed means 27, the piston 34 of the latter moving back into the syringe body under the effect of this introduction of dough, in order to compress the dough slightly.

It will be noted that during the transfer of dough from the reservoir-forming means into the syringe-formed means, the dough stored in the second reservoir part is pushed at a rate determined by the corresponding piston in order to mix it with the dough coming directly from the extruder.

Once the syringe-formed means are full, the piston 34 is in the rear position inside the syringe body and actuates the corresponding position sensor so that the central processing unit stops the activation of the cylinder actuator 22 and closes the shut-off means 16, the dough accumulation and temporary-storage means 14 and the means 30 of closing off the orifice 28 corresponding to the syringe-formed means 27.

It may therefore be imagined that the dough accumulation and temporary-storage means, and more particularly the second reservoir part 18 thereof, are empty and may once again receive a defined quantity of dough produced continuously by the extruder.

During this time, the robot 38 is controlled by the central processing unit so as to move the syringe-formed means 27 from their charging position to a position for discharging the dough contained in the syringe body, for example into the mould cavity 41 of the compression mould 29.

For this purpose, the central processing unit causes the means 30 of shutting the charging/discharging orifice 28 to open and actuates the cylinder actuator 36 so that the latter moves the piston 34 into the syringe body so as to eject the dough from this body, while at the same time moving this body by means of the arm of the robot 38 along a defined path in this mould cavity 41 so that a bead of dough is properly distributed in the latter, the means 44 of immobilizing the bead of dough in the mould cavity being in the active position, it being possible to tailor this distribution depending on the geometry of the mould.

Once this deposition of dough has been accomplished, the central processing unit causes these immobilizing means 44 to retract and the mould 29 to close, that is to say it applies the header die 42 of the latter against the mould cavity 41 so as to form the component.

During this time, the robot 38 moves the syringe-formed means 27 to their charging position for a new cycle of removing dough from the dough accumulation and temporary-storage means 14, which become filled during this time.

A new operating cycle may then commence.

It will be noted that throughout these operations, the temperature of the various portions of the production means, the dough accumulation and temporary-storage means and the dough removal and introduction means is controlled by this central processing unit, as is the inert-gas atmosphere optionally present in these various means.

It was pointed out earlier that the mould could also be a mould for manufacturing components by injecting fibre-reinforced thermoplastic into the mould.

In this case, the handling robot 38 is designed to place the syringe-formed means 27 so as to face an orifice for introduction of fibre-reinforced thermoplastic into this mould and to inject this compound under pressure into this mould so as to obtain the component.

Of course, it goes without saying that several syringe-formed means may be used in succession, in combination with one or more robots for handling them.

Thus, for example, one of these syringe-formed means may be in the dough charging position, at the exit of the dough accumulation and storage means, while another is in the position for discharging the dough into a corresponding mould, thereby making it possible to improve the production rates by charging in the background time of one of these means with respect to the other.

Of course, it goes without saying that various embodiments of this plant may be envisaged and that various improvements may be made thereto.

Thus, for example, and according to another embodiment, the dough accumulation and temporary-storage means may be provided directly in the dough-output end zone of the production means and, in particular, of the extruder.

Moreover, various embodiments of the dough accumulation and temporary-storage means and of the means of removing and of introducing this dough may also be envisaged.

Of course, control means other than those described with regard to FIG. 6 may also be envisaged.

What is claimed is:

1. A plant for manufacturing structural components made of fibre-reinforced thermoplastic, characterized in that it comprises:

means (1) of continuous production of a dough of a fibre-reinforced thermoplastic compound, having input means for receiving the thermoplastic (4) and the reinforcing fibres (6);

means (14) of accumulation and of temporary storage of the dough produced, comprising a reservoir-forming storage means (15) provided with an inlet connected to the production means (1) and an exit provided with shut-off means (16) connected to means of controlling the opening and closing of these shut-off means; and means (26) of removing dough from the accumulation and temporary storage means (14) and of introducing this removed dough into a mould (29) for forming the component, these means (26) comprising syringe-formed means (27) which include at least one dough charging/discharging orifice (28), which means are carried by handling means (38) and can move between a first position for charging with dough, in which position the dough charging/discharging orifice (28) of the syringe-formed means (27) is opposite the exit of the dough accumulation and temporary-storage means (14) and the shut-off means (16) of this exit are opened in order to allow transfer of the dough from these accumulation and temporary-storage means (14) to the syringe-formed means (27), and a second position for introducing the dough with which these means are charged into the mould (29) for forming the component.

2. Plant according to claim 1, characterized in that the means (1) of continuous production of the dough comprise a temperature-regulated extruder (2) which receives, at a first input (3), the thermoplastic and, at a second input (5), the reinforcing fibres.

3. Plant according to claim 2, characterized in that the extruder (2) includes an elongate barrel (7) in which at least two parallel and intermeshing screws (8) are arranged, these screws being associated with rotational driving means and the barrel including thermoplastic and reinforcing-fibre inlet orifices (9, 10) associated with feed hoppers (11, 12).

4. Plant according to claim 2, characterized in that the extruder (2) includes venting means.

5. Plant according to claim 1, characterized in that the thermoplastic is polypropylene.

6. Plant according to claim 1, characterized in that the reinforcing fibres are mineral fibres.

7. Plant according to claim 1, characterized in that the reinforcing fibres are organic fibres.

8. Plant according to claim 1, characterized in that the means (14) of accumulation and of temporary storage of the dough are formed by a dough-output end zone of the production means (1).

9. The plant according to claim 1, characterized in that the dough accumulation and temporary-storage means (14) are formed by temperature-regulated reservoir-forming storage means (15) which are arranged at the exit end of the production means (1).

10. A plant for manufacturing structural components made of fibre-reinforced thermoplastic, characterized in that it includes:

means (1) of continuous production of a dough of a fibre-reinforced thermoplastic compound, having input means for receiving the thermoplastic (4) and the reinforcing fibres (6);

means (14) of accumulation and of temporary storage of the dough produced; and means (26) of removing dough from the accumulation and temporary-storage means (14) and of introducing this removed dough into a mould (29) for forming the component;

in that the dough accumulation and temporary-storage means (14) are formed by temperature-regulated reservoir-forming storage means (15) which are arranged at the exit end of the production means (1), the inlet of which is connected to the exit of these production means and the exit of which includes shut-off means (16) connected to means of controlling the opening and closing of these shut-off means; and in that the reservoir-forming storage means (15) comprise a first reservoir part (17), a first end of which forms the inlet of these means and is connected to the production means (1) and a second end of which forms the exit of these means, this second end being provided with said shut-off means (16), and a second reservoir part (18) which extends from the first reservoir part (17), dough compaction/ejection means being arranged in this second part (18).

11. Plant according to claim 10, characterized in that the dough compaction/ejection means (19) comprise a piston (20) mounted so that it can move in this second reservoir part (18), this piston including a rod (21) associated with means (22) of controlling the movement of this piston.

12. Plant according to claim 11, characterized in that the control means (22) comprise means of braking the movement of the piston (20) in one direction, during accumulation of dough in the accumulation and temporary-storage means, and means of moving the piston (20) in the other direction in order to eject the dough from the accumulation and temporary-storage means (14).

13. Plant according to claim 12, characterized in that the control means (22) are associated with sensors which detect the position of the piston (20) in the second reservoir part (18) and with means of controlling their operation.

14. Plant according to claim 11, characterized in that the control means include a cylinder actuator (22).

15. Plant according to claim 10, characterized in that the dough accumulation and temporary-storage means (14) comprise an overflow valve (25).

16. Plant according to claim 15, characterized in that the overflow valve (25) is provided on the second reservoir part (18).

17. Plant according to claim 10, characterized in that heating means (23, 24) are arranged around each part (17, 18) of the reservoir-forming means.

18. A plant for manufacturing structural components made of fibre-reinforced thermoplastic, characterized in that it includes:

means (1) of continuous production of a dough of a fibre-reinforced thermoplastic compound, having input means for receiving the thermoplastic (4) and the reinforcing fibres (6);

means (14) of accumulation and of temporary storage of the dough produced; and means (26) of removing dough from the accumulation and temporary-storage means (14) and of introducing this removed dough into a mould (29) for forming the component; and in that the dough removal and introduction means (26) comprise temperature-regulated syringe-formed means (27) which include at least one dough charging/discharging orifice (28), which means are carried by handling means (38) and can move between a first position for charging with dough in which position the dough charging/discharging orifice (28) of the syringe-formed means (27) is opposite the exit of the dough accumulation and temporary-storage means (14) in order to allow transfer of the dough from these accumulation and temporary-storage means (14) to the syringe-formed means (27), and a second position for introducing the dough with which these means are charged into the mould (29) for forming the component; and in that the dough charging/discharging orifice (28) of the syringe-formed means (27) is associated with means (30) of shutting off this orifice, the opening and closing of which means are controlled by control means.

19. Plant according to claim 18, characterized in that the shut-off means (30) comprise a shutter for cutting off the dough.

20. Plant according to claim 1, characterized in that the syringe-formed means (27) comprise a syringe body (31), one end of which includes the charging/discharging orifice (28), in which syringe body are arranged dough compaction/ejection means (33).

21. Plant according to claim 20, characterized in that the dough compaction/ejection means comprise a piston (34) mounted so that it can move in the syringe body (31), this piston including a rod (35) associated with means (36) of controlling the movement of this piston.

22. Plant according to claim 21, characterized in that the control means (36) comprise means of braking the movement of the piston (34) in one direction, during charging of the syringe-formed means (27) with dough, and means of moving the piston (34) in the other direction in order to discharge the dough from these syringe-formed means (27).

23. Plant according to claim 21, characterized in that the control means are associated with sensors which detect the position of the piston (34) in the syringe body and with means of controlling their operation.

24. Plant according to claim 21, characterized in that the control means comprise a cylinder actuator (36).

25. Plant according to claim 1, characterized in that heating means (32) are arranged around the syringe-formed means (27).

26. Plant according to claim 1, characterized in that the handling means comprise at least one handling robot (38) provided with a moving arm (40) at the end of which are placed the syringe-formed means (27) and the operation of which is controlled by control means for moving these means between their first and second positions.

27. Plant according to claim 1, characterized in that the mould is a compression mould (29) comprising a mould cavity (41), in which the dough is deposited in the form of a bead, and a corresponding header die (42).

28. Plant according to claim 27, characterized in that the mould cavity (41) includes means (44) of temporarily immobilizing the deposited bead of dough.

29. Plant according to claim 28, characterized in that the means (44) of immobilizing the bead of dough can move between an immobilizing active position and a retracted position.

30. Plant according to claim 29, characterized in that the immobilizing means comprise needles (44) passing through corresponding holes in the mould cavity (41) and projecting, in the active position, above the surface of the latter during deposition of the bead of dough and a retracted position in the mould cavity (41).

31. Plant according to claim 30, characterized in that the needles (44) are carried by a support plate (45) which can be moved under the mould cavity (41) by operating means associated with control means.

32. Plant according to claim 1, characterized in that it includes means of maintaining the production means, the accumulation and temporary-storage means and the removal and introduction means under a controlled inert-gas atmosphere.

33. Plant according to claim 32, characterized in that the inert gas is nitrogen.

34. Plant according to claim 1, characterized in that it includes a central control unit (50) for operating the production means, the accumulation and temporary-storage means, the removal and introduction means and the mould.

35. A plant for manufacturing structural components made of fibre-reinforced thermoplastic, characterized in that it includes:

- means (1) of continuous production of a dough of a fibre-reinforced thermoplastic compound, having input means for receiving the thermoplastic (4) and the reinforcing fibres (6);
- means (14) of accumulation and of temporary storage of the dough produced; and
- means (26) of removing dough from the accumulation and temporary-storage means (14) and of introducing this removed dough into a mould (29) for forming the component;
- in that the dough accumulation and temporary-storage means (14) are formed by temperature-regulated reservoir-forming storage means (15) which are arranged at the exit end of the production means (1), the inlet of which is connected to the exit of these production means and the exit of which includes shut-off means (16) connected to means of controlling the opening and closing of these shut-off means; and
- in that the reservoir-forming storage means (15) comprise a first reservoir part (17), a first end of which forms the inlet of these means and is connected to the production means (1) and a second end of which forms the exit of these means, this second end being provided with shut-off means (16), and a second reservoir part (18) which extends from the first reservoir part (17), dough compaction/ejection means being arranged in this second part (18);
- in that heating means (23, 24) are arranged around each part (17, 18) of the reservoir-forming means; and
- in that the heating means comprise electrical resistance elements whose supply is controlled in order to regulate the temperature.

36. The plant according to claim 1, characterized in that the reservoir-forming storage means (15) comprise a first reservoir part (17), a first end of which forms the inlet of these means and is connected to the production means (1) and a second end of which forms the exit of these means, this second end being provided with said shut-off means (16), and a second reservoir part (18) which extends from the first reservoir part (17), dough compaction/ejection means being arranged in this second part (18).

37. The plant according to claim 36, characterized in that the dough compaction/ejection means (19) comprise a piston (20) mounted so that it can move in this second reservoir part (18), this piston including a rod (21) associated with means (22) of controlling the movement of this piston.

38. The plant according to claim 37, characterized in that the control means (22) comprise means of braking the movement of the piston (20) in one direction, during accumulation of dough in the accumulation and temporary-storage means, and means of moving the piston (20) in the other direction in order to eject the dough from the accumulation and temporary-storage means (14).

39. The plant according to claim 38, characterized in that the control means (22) are associated with sensors which detect the position of the piston (20) in the second reservoir part (18) and with means of controlling their operation.

40. The plant according to claim 37, characterized in that the control means include a cylinder actuator (22).

41. The plant according to claim 36, characterized in that the dough accumulation and temporary-storage means (14) comprise an overflow valve (25).

42. The plant according to claim 41, characterized in that the overflow valve (25) is provided on the second reservoir part (18).

43. The plant according to claim 36, characterized in that heating means (23, 24) are arranged around each part (17, 18) of the reservoir forming means.

44. The plant according to claim 1, characterized in that the dough removal and introduction means (26) comprise temperature-regulated syringe-formed means (27).

45. The plant according to claim 1, characterized in that the dough charging/discharging orifice (28) of the syringe-formed means (27) is associated with means (30) of shutting off said orifice, the opening and closing of which means are controlled by control means.

46. The plant according to claim 45, characterized in that the shut-off means (30) comprise a shutter for cutting off the dough.

47. The plant according to claim 1, characterized in that the mould is an injection mould into which the dough is injected under pressure.

48. The plant according to claim 43, characterized in that the heating means comprises electrical resistance elements whose supply is controlled in order to regulate the temperature.

49. The plant according to claim 25, characterized in that the heating means comprises electrical resistance elements whose supply is controlled in order to regulate the temperature.

* * * * *